United States Patent
Wall

Patent Number: 5,724,871
Date of Patent: Mar. 10, 1998

[54] STRIPPING TOOLS

[75] Inventor: Jonathan Richard Wall, Oxley, Great Britain

[73] Assignee: Ross Courtney Limited, West Midlands, United Kingdom

[21] Appl. No.: 810,241

[22] Filed: Mar. 3, 1997

Related U.S. Application Data

[63] Continuation of Ser. No. 524,353, Sep. 6, 1995, abandoned.

[30] Foreign Application Priority Data

Oct. 12, 1994 [GB] United Kingdom .................. 9420577

[51] Int. Cl.⁶ ........................................................ H02G 1/12
[52] U.S. Cl. ........................................................ 81/9.43
[58] Field of Search ........................... 81/9.4, 9.41, 9.42, 81/9.43, 9.44

[56] References Cited

U.S. PATENT DOCUMENTS

| | | | |
|---|---|---|---|
| 4,112,791 | 9/1978 | Wiener | 81/9.43 |
| 4,395,928 | 8/1983 | Undin et al. | 81/9.43 |
| 4,485,696 | 12/1984 | Bieganski | 81/9.41 |

*Primary Examiner*—D. S. Meislin
*Attorney, Agent, or Firm*—Learman & McCulloch

[57] ABSTRACT

A wire stripping tool (FIG. 1) has outer jaws 12, 18 which can be closed together by levers 10, 16 acting via a link 24. Inner jaws 34, 36 are so closed to cut the wire sheath, and then actuator 32 is displaced left to right to move the inner cutting jaws and displace the cut sheath along the wire core. The actuator has a solely linear movement, being guided by roller 14 and pin 42, whilst jaw closing and subsequent re-opening to complete the cycle of operations is carried out by cam plate 28 which is pivoted on the actuator and to the link. Lost motion is provided at two places in the actuator by pin 38 in slot 39 and pin 26 in slot 30.

6 Claims, 7 Drawing Sheets

STRIPPING TOOLS

This application is a continuation of application Ser. No. 08/524,353 filed on Sep. 6, 1995 now abandoned.

This invention relates to stripping tools of the kind used for example, for baring the conductor of a sheathed electric cable. Tools for this purpose often have outer jaws to grip the cable sheath and inner jaws which are closed between the outer jaws so as to cut part-way into the cable. Then in a second stage of the operation the inner jaws are displaced relative to the outer jaws, along their length, to strip the cut sheath. The first stage of the action may continue until the resistance of the cable terminates it, and the second stage follows.

BACKGROUND OF THE INVENTION

There have been many proposals for tools of this kind for example the one shown in EP 0 007 699. In that tool, an actuator plate is provided with a complex cam slot, so that moving a lever handle first causes the jaw closing movement and then the jaw displacement whilst the actuator plate moves first laterally and then longitudinally. In some circumstances this could create difficulties.

SUMMARY OF THE INVENTION

The object of the present invention is to provide an improved tool.

According to the invention a stripping tool comprises inner and outer jaws, a lever mechanism for closing the jaws and subsequently displacing one set relative to the other, including an actuator coupled to the lever and to the inner jaws for said displacement and a separate cam plate provided on the actuator and associated with the mechanism for providing opening and closing movements of the jaws accompanied by at least pivotal movement of the cam plate on the actuator whereby the actuator has a solely linear movement in a complete cycle of operations.

One embodiment of the present invention is now more particularly described with reference to the accompanying drawings wherein the figures show a tool in a series of successively occupied positions in one complete cycle of operations, namely:

DETAILED DESCRIPTION

Figure 1:
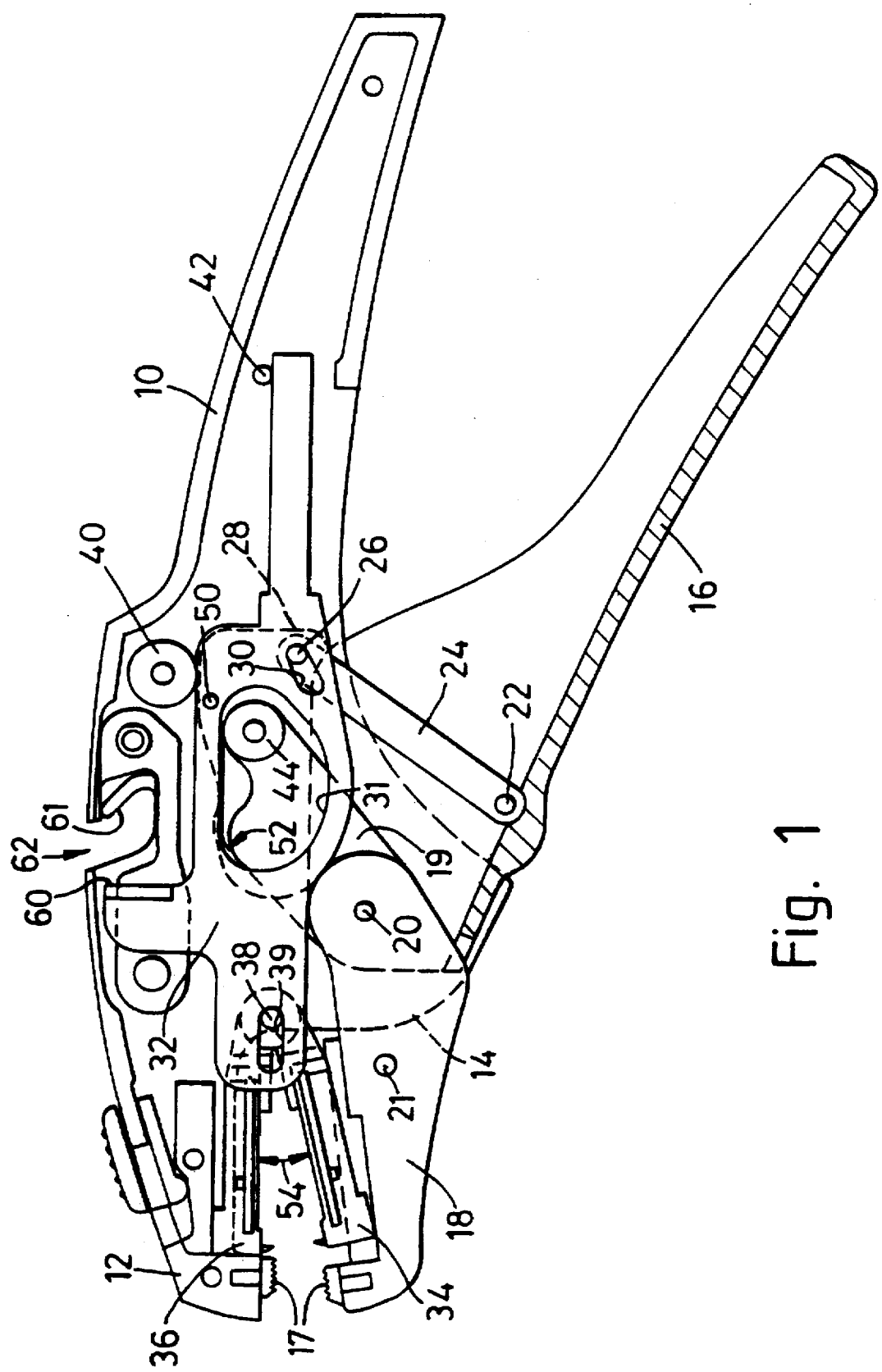
FIG. 1 shows the tool ready to receive a cable.

Turning now to the drawings, and particularly FIG. 1 thereof, the tool comprises a body in the form of a first handle 10 which is integral with a jaw 12, and between the two has a lateral extension 14. The extension 14 may be bifurcated and much of the illustrated mechanism lies between the two parts of the extension. Moreover, some parts of the mechanism are duplicated so as to lie on opposite sides of a central component, with the two parts connected together, but all of this is conventional in tools of this kind and will not be further described in detail.

Figure 7:
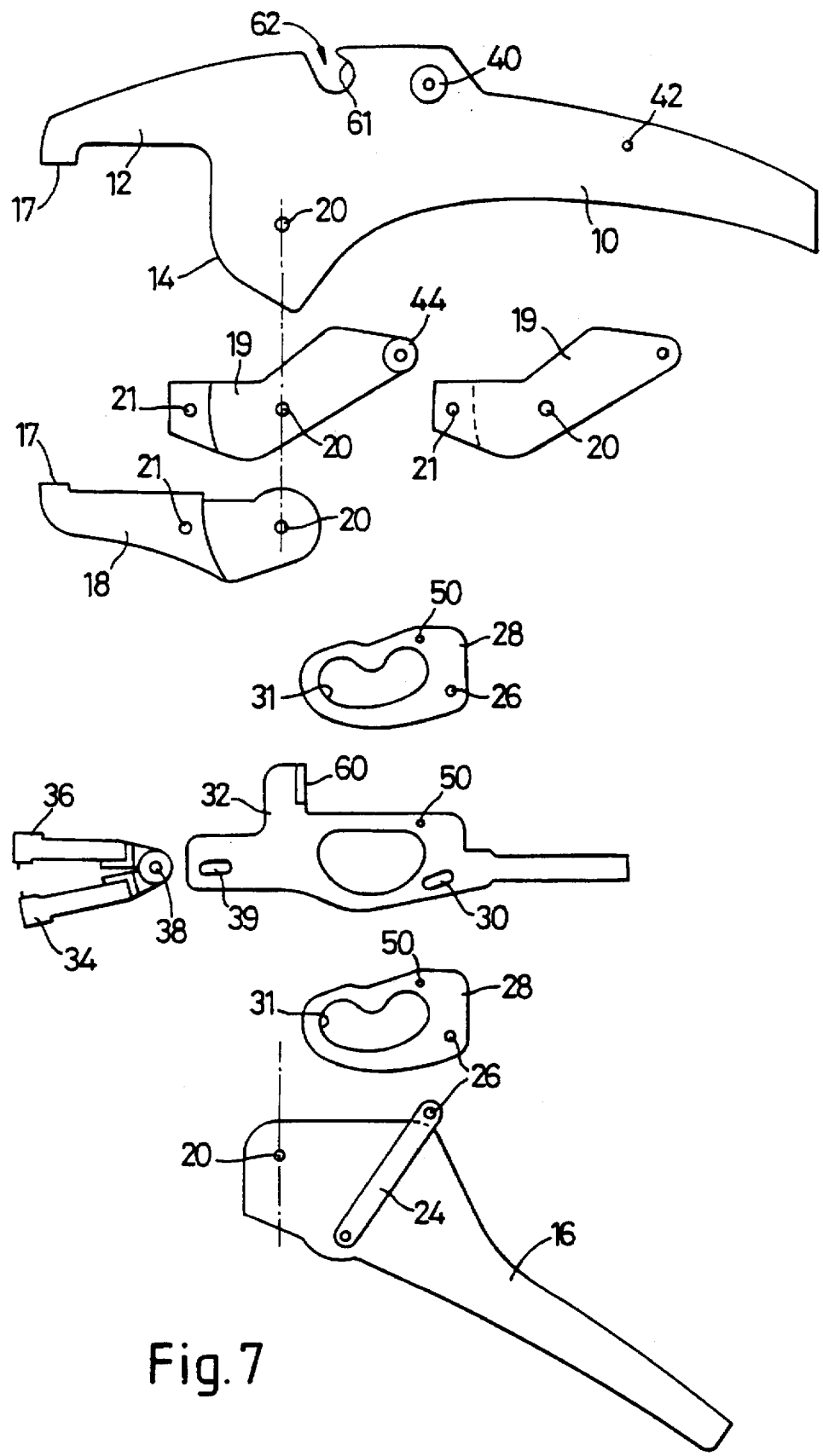
FIG. 7 is an exploded view showing most of the components of the tool.

A second handle 16 is pivoted on a pin 20 (see FIG. 7) carried by the extension 14. Also pivoted on the same pin but capable of independent pivoting relative to both handles is a second jaw conveniently assembled from parts 18, 19, 19, see FIG. 7 fixed together by a coupling rivet 21 and by a pin carrying a cam 44 conveniently in the form of a roller. The jaws have gripping faces 17, 17. The drive link 24 has opposite ends connected by pins, one of which is carried by the handle 16 and the other 26 is secured to cam plate 28, 28.

Actuator 32 is mounted for linear displacement generally in line with the axis of the wire to be stripped and is guided and constrained for such movement by roller 40 and pin 42 carried by handle 10.

inner jaws 34 36 are hinged on pin 38 running in a slot 39 in one end of the actuator. The inner jaws have cutting edges in conventional fashion and are guided for sliding movement along the length of the inner jaws as is well understood and also explained hereinafter.

The roller (cam follower) 44 at the end opposite the gripping end 17 is located in a kidney shaped cam slot 32 in the cam plate 28 having a camming surface.

The cam plate 28 is pivoted on pin 50 carried by the actuator. Follower pin 26 (which couples the link 24 to the cam plate) extends through slot 30 in the actuator. The actuator has an extensive cut-away area substantially equal in size, shape and location to the area swept by the kidney shaped slot 31 in the possible movement of the cam plate pivoting on the pin 50 during a complete cycle of operations.

Figure 2:
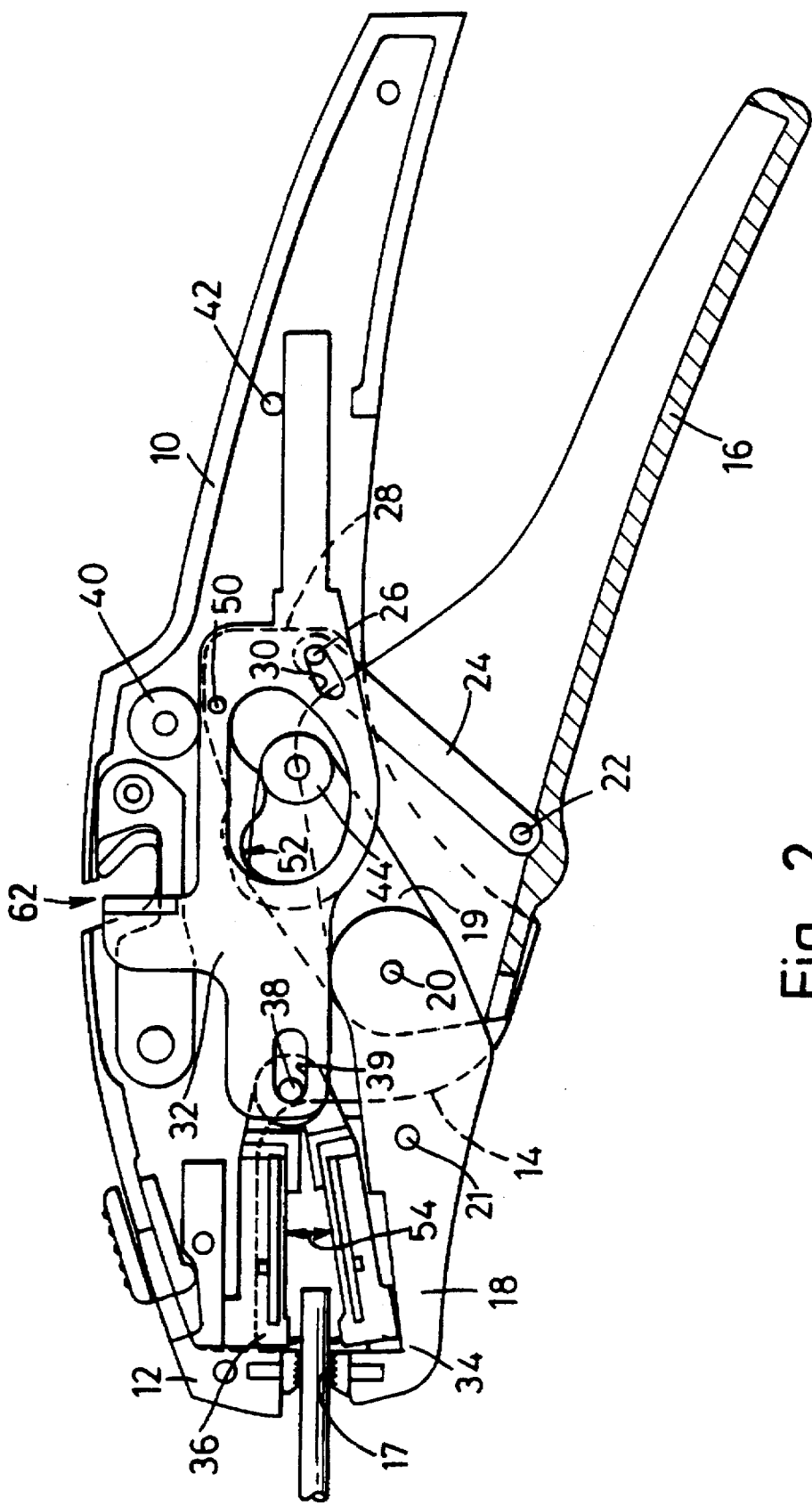
FIG. 2 shows a cable clamped.
Figure 6:
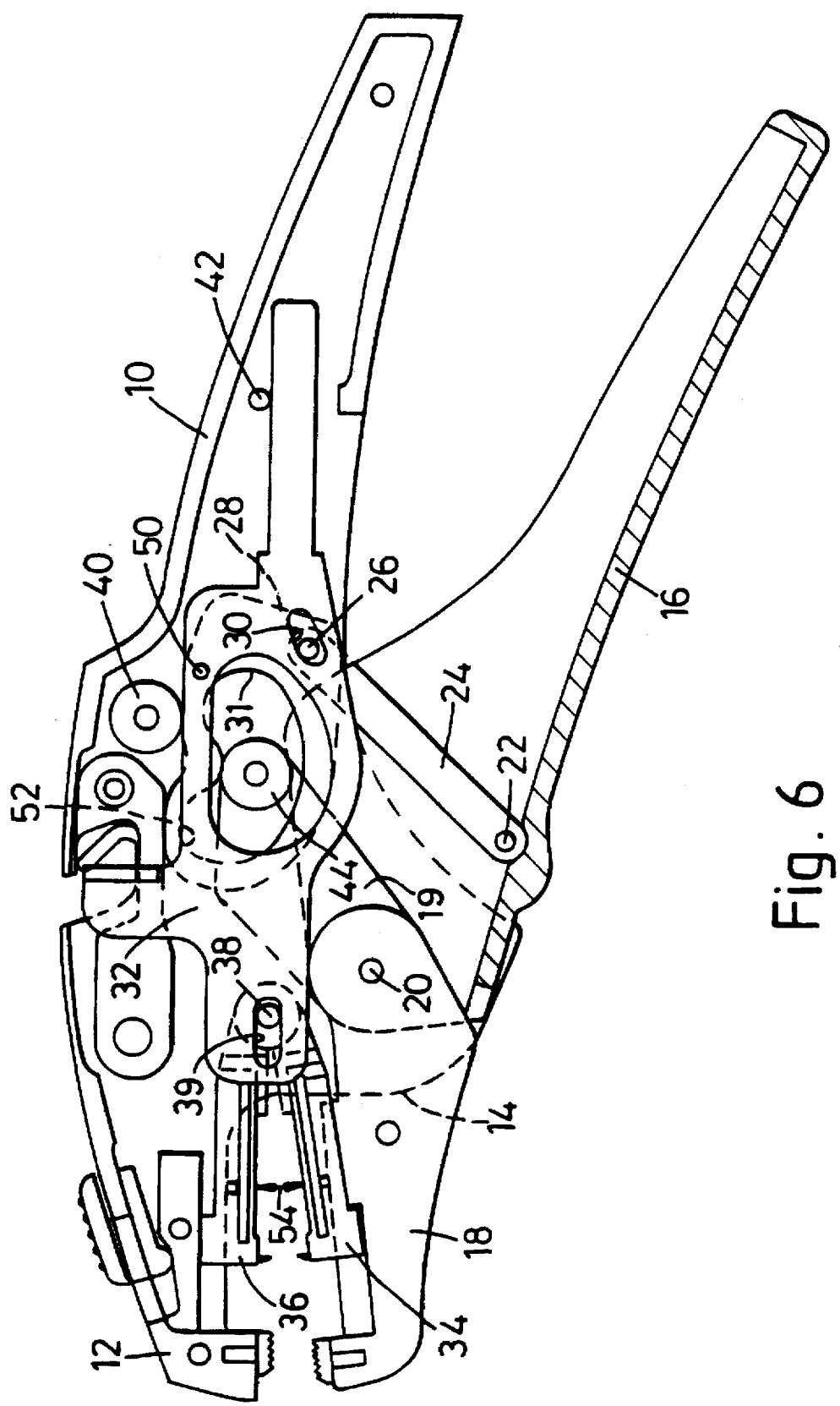
FIG. 6 shows the tool at the midpoint of the return stroke.

In operation, starting from FIG. 1, the lever handle 16 is moved towards the handle 10 which urges pin 26 to the righthand end of the slot 30 and causes the handle to swing about pin 26 as will be seen by comparing the angle of the link 24 in FIGS. 1 and 6. The pin 26 thus drives the cam plate to pivot about pin 50 carried by handle 10, thus displacing the cam follower 44 through the FIG. 1 to the FIG. 2 position and this pivots the jaw 18 on pin 20 so that the gripping surfaces 17, 17 on both jaws 12 18 close onto the cable. At the same time cutting surfaces on jaws 34 36 penetrate the cable sheath. The actuator 32 is substantially unaffected because the pin 26 moves along the slot 30 in this action.

Figure 3:
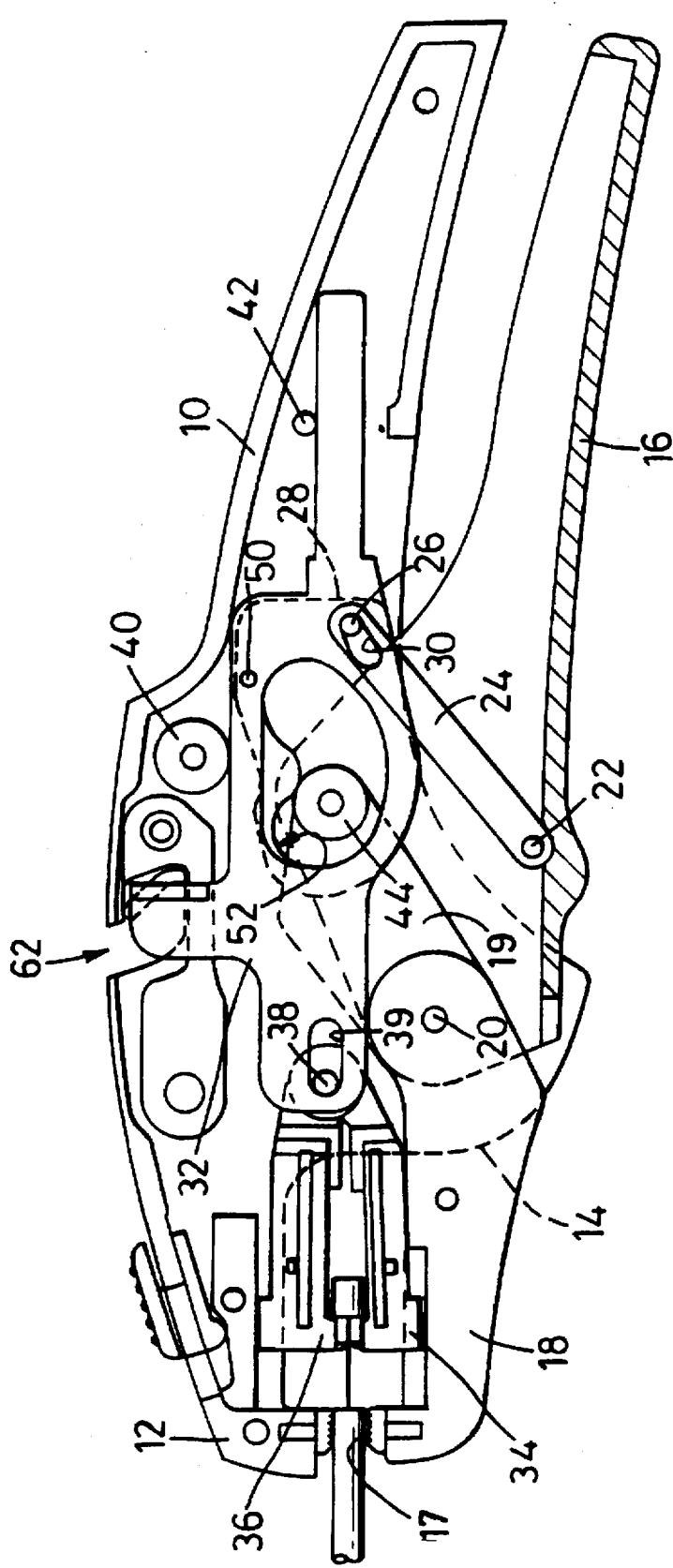
FIG. 3 shows a cable stripped.

Further travel of the handle 16 to the FIG. 3 position swings the link 24 still further and now displaces the actuator 32, because the pin 26 has reached the end of slot 30, and the cam plate also rocks as shown. The movement of the actuator from left to right in the drawing effects the required stripping action, moving the inner jaws relative to the outer jaws. At the end of this stripping movement, see FIG. 4, the cam follower 44 lies at the end of the cam slot 31 and the movement of the roller 44 into the end recess 52, FIG. 1, allows the jaw 18 to pivot counter clockwise on pin 20 and hence shift to the open position so as to release the cable.

Figure 4:
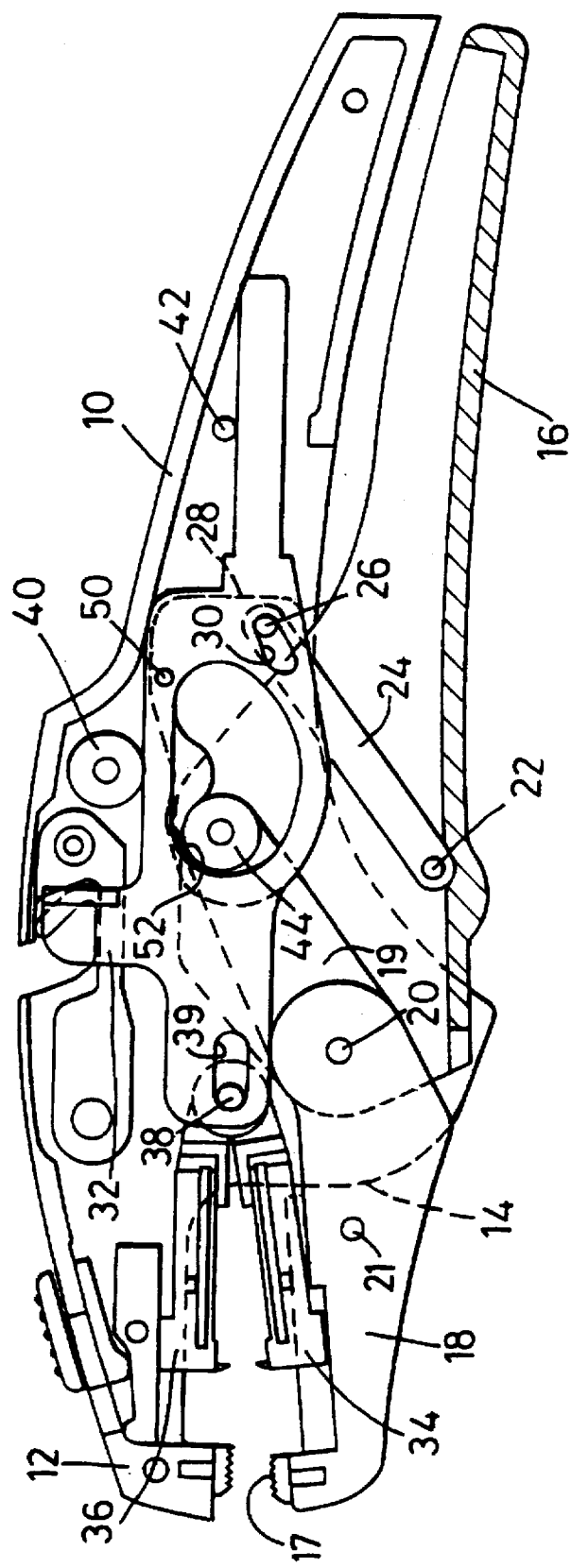
FIG. 4 shows the jaws open and the cable removed.
Figure 5:
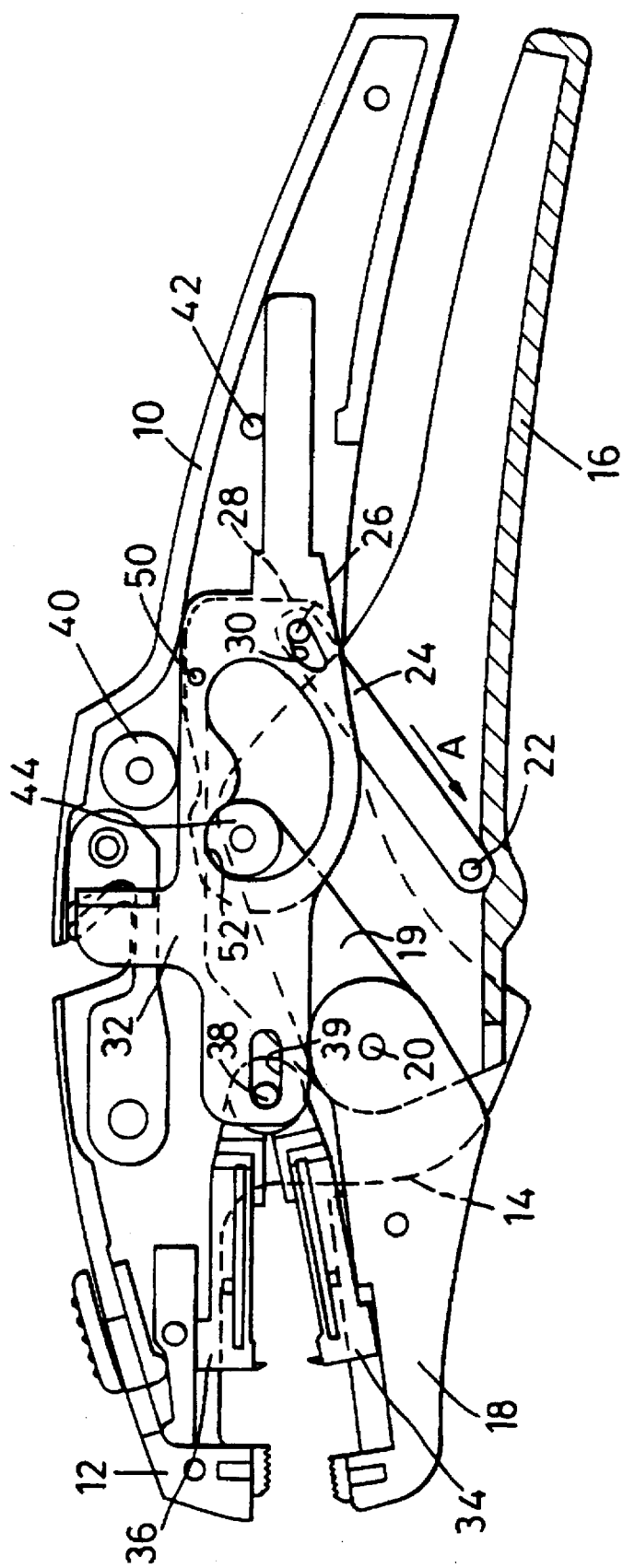
FIG. 5 shows the tool at the start of the return part of the cycle with the jaws open further.

As the handle 16 is released and starts to move away from the handle 10, compare FIGS. 4 and 5, the slight lengthwise movement of the link in the direction A (FIG. 5) causes the cam plate to turn clockwise about the pin 50 which allows additional movement of the cam follower 44 counter clockwise to open the jaws further (FIG. 5) and with even further cam plate movement and lever and link movement the tool goes through the FIG. 6 position back to the FIG. 1 position. The complete cycle allows for the tool to be readied for the next cycle of operations, in particular open it to the required extent to receive the cable.

The opening movement of the handle and mechanism generally may be spring urged. Usually a spring will be located between the inner jaws at 54 and possibly elsewhere for these purposes.

The actuator is provided with a cutting edge 60 for cooperation with a second face 61 at one side of a wire receiving recess 62 to enable the tool to be used to trim a wire to length in known fashion. The solely linear displacement of the actuator is especially convenient for this ancillary purpose.

If a particularly large diameter wire is inserted between the outer jaws, there will be relatively little jaw closing movement before further closing movement is resisted in which case the pin 26 may not reach the end of the slot and the stripping movement will be initiated after less pivotal movement of the cam plate by forces transmitted from the link 24 via the pin 26 and the cam plate and driving the actuator via the pin 50. On the other hand, once the pin has reached the end of the slot 30, further pivotal movement of the cam plate in a counter-clockwise direction about pin 50 is prevented, and due to the vector forces resulting from the angle of link 24, further closing movement of the handle 16 is applied primarily to actuator 32 displacement. Hence it will be appreciated that the length of the slot 30 has an effect on the possible movement of the handle and the extent of jaw closing and thus the range of diameters of wire which can be treated. However other parameters are also involved in this as will be appreciated by those skilled in the art including for example the ratio of the dimensions between the pin 21 and the gripping surfaces 17 on the one hand and the pin 21 and the cam follower 44 on the other hand; also, the dimension between the pin 20 and the pivot pin between the drive link 24 and the handle and again the angle of the handle and hence the distribution of vector forces. These matters are well understood by those skilled in the art and it will be unnecessary to explain further.

I claim:

1. A wire stripper for stripping a portion of insulating sheath from a cable comprising: a body having a first outer jaw; a second outer jaw pivoted on said body; a pair of inner jaws supported between said outer jaws; a lever pivoted on said body; an actuator coupled to said inner jaws and supported by said body for selective linear movement and against lateral movement relative to said body for displacing said inner jaws axially of the cable relative to said outer jaws; a cam pivoted on said actuator for linear movement therewith and engaging said second outer jaw; and link means pivoted at one end to said lever and at an opposite end to said cam for enabling said cam to pivot initially relative to said actuator and effect the closing of said outer jaws about the sheath of such cable and the closing of the inner jaws to cut a portion of the sheath and thereafter effect linear displacement of said actuator and said inner jaws to strip the cut portion of the sheath from the cable.

2. The wire stripper of claim 1 wherein said cam includes a follower pin and said actuator includes a slot accommodating said pin providing lost motion connection therebetween.

3. The wire stripper of claim 2 wherein said actuator includes a second slot and said inner jaws include a follower pin accommodated in said second slot to provide a lost motion connection therebetween.

4. The wire stripper of claim 1 wherein said cam includes a kidney-shaped slot providing a camming surface engaging a cam follower on said second outer jaw.

5. The wire stripper of claim 1 wherein said body includes guides supporting said actuator for said linear movement and against said lateral movement.

6. A wire stripper comprising: a pair of outer jaws pivotable toward and away from one another; a pair of inner jaws supported between said outer jaws; a lever mechanism for pivoting said outer and inner jaws to a closed position about a sheathed cable causing said outer jaws to grip the sheath of the cable and said inner jaws to penetrate and cut the sheath; an actuator coupled to said inner jaws and supported for selective linear movement and against lateral movement for selectively displacing said inner jaws axially of the cable relative to said outer jaws so as to strip the cut portion of the sheath from the cable; and a cam plate pivoted to said actuator, said cam plate having a first slot and said actuator having a corresponding first follower pin accommodated within said slot; a rigid linkage coupling one of said outer jaws to said first follower pin of said cam plate; a second axially extending slot provided in said actuator and a second follower pin coupled to said inner jaws and accommodated within said second slot; and a kidney-shaped camming slot provided in said cam plate and an associated cam follower provided on said one of said outer jaws and accommodated in said camming slot, whereby actuation of said lever mechanism during an initial stage of movement causes displacement of said first follower pin along said first slot by said linkage causing said first pin to engage an end wall of said first slot and in turn causing said cam plate to pivot and displace said cam follower from one end of said camming slot toward its opposite end which pivots said inner and outer jaws closed about the cable to grip and cut the sheath and further causes simultaneous linear displacement of said actuator and said second slot by a predetermined distance which advances said second pin from one end of said second slot to its opposite end with lost motion so as to prevent corresponding axial displacement of said inner jaws during said first stage, and during a second stage of movement continued displacement of said first pin causes further axial displacement of said actuator and corresponding axial displacement of said first pin and said inner jaws to effect the stripping of the cut portion of the sheath from the cable; and during a final stage of movement continued displacement of said first pin causes said cam plate to pivot further displacing said cam follower to the opposite end of said camming slot and in turn causes said outer and inner jaws to pivot open and release the cable.

* * * * *